United States Patent
Shin et al.

(10) Patent No.: US 7,693,094 B2
(45) Date of Patent: Apr. 6, 2010

(54) APPARATUS FOR BIDIRECTIONAL COMMUNICATION USING AUXILIARY BAND IN WIRELESS COMMUNICATION SYSTEM

(75) Inventors: Oh-Soon Shin, Suwon-si (KR); Sang-Boh Yun, Seongnam-si (KR); Jin-Choo Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 304 days.

(21) Appl. No.: 11/864,092

(22) Filed: Sep. 28, 2007

(65) Prior Publication Data
US 2008/0080405 A1     Apr. 3, 2008

(30) Foreign Application Priority Data
Sep. 29, 2006    (KR) ...................... 10-2006-0096028

(51) Int. Cl.
*H04J 3/00* (2006.01)
(52) U.S. Cl. .................. 370/280; 370/343; 370/345
(58) Field of Classification Search ................ 370/277, 370/278, 279, 280, 281, 282, 293, 294, 295, 370/343, 344, 347, 348
See application file for complete search history.

(56) References Cited

U.S. PATENT DOCUMENTS

| | | | | | |
|---|---|---|---|---|---|
| 5,319,798 | A | * | 6/1994 | Watanabe | .................... 455/76 |
| 6,157,669 | A | * | 12/2000 | Kotzin | ........................ 375/132 |
| 6,859,655 | B2 | * | 2/2005 | Struhsaker | .................. 455/450 |
| 7,577,118 | B2 | * | 8/2009 | Haumonte et al. | .......... 370/330 |
| 7,586,949 | B1 | * | 9/2009 | Barany et al. | ................ 370/474 |
| 2002/0136170 | A1 | * | 9/2002 | Struhsaker | .................. 370/280 |
| 2002/0173277 | A1 | * | 11/2002 | Takao et al. | ................... 455/77 |
| 2003/0156570 | A1 | * | 8/2003 | Alamouti et al. | ............ 370/347 |
| 2006/0013186 | A1 | * | 1/2006 | Agrawal et al. | ............. 370/344 |
| 2006/0067278 | A1 | * | 3/2006 | Li et al. | ...................... 370/335 |
| 2008/0013480 | A1 | * | 1/2008 | Kapoor et al. | .............. 370/328 |

* cited by examiner

*Primary Examiner*—Chi H. Pham
*Assistant Examiner*—Kevin Mew
(74) *Attorney, Agent, or Firm*—Jefferson IP Law, LLP

(57) ABSTRACT

An apparatus for bidirectional communication using one or more auxiliary bands in a wireless communication system is provided. A primary band transmitter transmits data over one or more primary bands in a frame. A primary band receiver receives data over the one or more primary bands in the frame. An auxiliary band transmitter transmits data over one or more first auxiliary bands in the frame. An auxiliary band receiver receives data over the one or more first auxiliary bands or over the one or more first auxiliary bands and one or more second auxiliary bands in the frame. Therefore, it is possible to facilitate a low-delay service and to cope with a rapid channel change due to high-speed movement.

17 Claims, 7 Drawing Sheets

# APPARATUS FOR BIDIRECTIONAL COMMUNICATION USING AUXILIARY BAND IN WIRELESS COMMUNICATION SYSTEM

PRIORITY

This application claims the benefit under 35 U.S.C. §119(a) of a Korean patent application filed in the Korean Intellectual Property Office on Sep. 29, 2006 and assigned Serial No. 2006-96028, the entire disclosure of which is hereby incorporated by reference.

BACKGROUND OF THE INVENTION

1. Field of the Invention

The present invention relates generally to a wireless communication system. More particularly, the present invention relates to an apparatus for bidirectional communication using one or more auxiliary bands in a wireless communication system.

2. Description of the Related Art

For bidirectional communication, a wireless communication system uses a duplex scheme capable of discriminating between downlink (DL) transmission and uplink (UL) transmission. Referring to FIGS. 1A and 1B, which illustrate conventional communication systems, the duplex scheme can be classified into a frequency division duplex (FDD) scheme (FIG. 1A) and a time division duplex (TDD) scheme (FIG. 1B). The FDD scheme discriminates between a DL 101 and a UL 103 by allocating different frequency bands to the DL 101 and the UL 103. The TDD scheme discriminates between a DL 105 and a UL 107 by allocating different transmission intervals to the DL 105 and the UL 107 while allocating the same frequency band thereto.

In the case of the FDD scheme, a guard band must be inserted between a DL band and a UL band in order to prevent DL-UL interference. Also, because a DL-UL ratio is fixed by the bandwidth, the FDD scheme is unsuited to accommodate a variable DL-UL asymmetric traffic. The FDD scheme is used in the 2G IS-95 system, the Global System for Mobile communications (GSM) system, and most of the 3G systems, which provide voice-oriented services. However, the FDD scheme is unsuitable for wireless communication systems providing data-oriented services.

The TDD scheme can effectively cope with an asymmetric traffic by flexibly adjusting a DL-UL ratio. Also, because the DL and UL links use the same frequency band, the TDD scheme can reduce the overhead necessary for feedback information using channel reciprocity. Thus, the TDD scheme enables the effective use of technologies which increase frequency use efficiency, such as adaptive modulation and multiple antenna techniques.

However, the TDD scheme is more complex than the FDD scheme in terms of synchronization. Also, a guard interval corresponding to a propagation delay and a switching delay must be inserted into a DL-UL transition gap, which causes an overhead in transmission of user data.

Furthermore, the frame length must be increased in order to reduce the overhead due to the guard interval and frame-by-frame control signals such as sync signals. However, when the frame length is increased, an OFF interval of each of DL and UL and a delay of control signals such as channel information and feedback information for a retransmission request are increased. Therefore, in the case of user data requiring a small delay and user data of high-speed movement, the performance degradation occurs due to a delay of the control signal.

SUMMARY OF THE INVENTION

An aspect of the present invention is to address at least the above-mentioned problems and/or disadvantages and to provide at least the advantages described below. Accordingly, an aspect of the present invention is to provide an apparatus for bidirectional communication using one or more auxiliary bands in a wireless communication system.

Another aspect of the present invention is to provide an apparatus of a TDD wireless communication system for transmitting a data signal and a control signal successively in units of a slot shorter than a frame by adding one or more auxiliary bands to a primary band.

Still another aspect of the present invention is to provide an apparatus of a TDD wireless communication system in which one auxiliary band is added to a primary band and the auxiliary band is used for UL/DL transmission when the primary band is used for DL/UL transmission.

Yet another aspect of the present invention is to provide an apparatus of a TDD wireless communication system in which two auxiliary bands are added to a primary band, one of the two auxiliary bands is dedicated to DL transmission, and the other is dedicated to UL transmission.

According to one aspect of the present invention, an apparatus for bidirectional communication using one or more auxiliary bands in a wireless communication system is provided. The apparatus includes a primary band transmitter for transmitting data over one or more primary bands in a frame, a primary band receiver for receiving data over the one or more primary bands in the frame, an auxiliary band transmitter for transmitting data over one or more first auxiliary bands in the frame and an auxiliary band receiver for receiving data over the one or more first auxiliary bands or over the one or more first auxiliary bands and one or more second auxiliary bands in the frame.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

As aspect of the present invention is intended to provide an apparatus for bidirectional communication based on the use of one or more auxiliary bands in a wireless communication system.

Figure 1A:
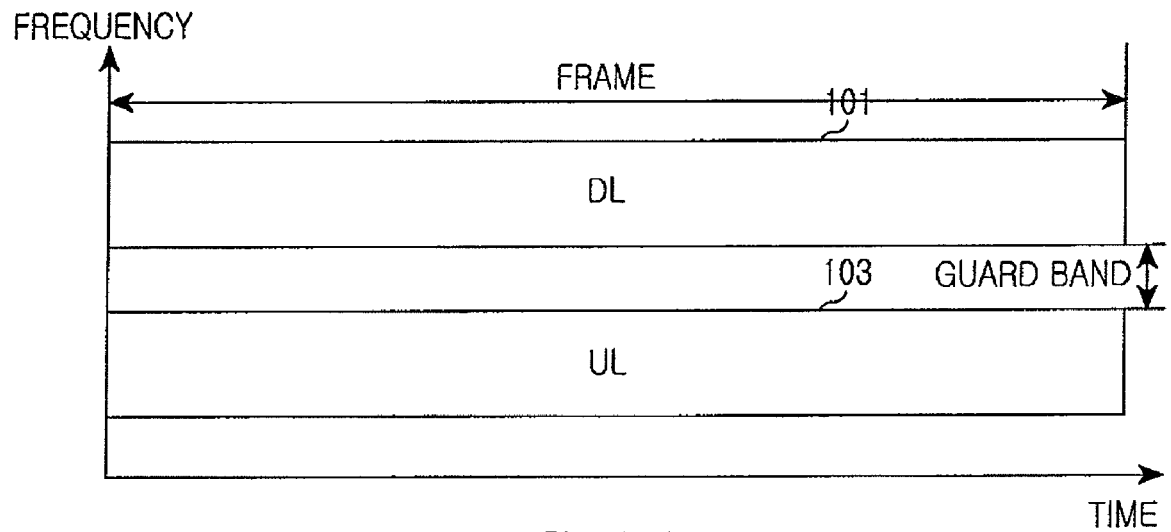
FIGS. 1A and 1B illustrate an FDD frame structure and a TDD frame structure in a conventional wireless communication system.
Figure 1B:
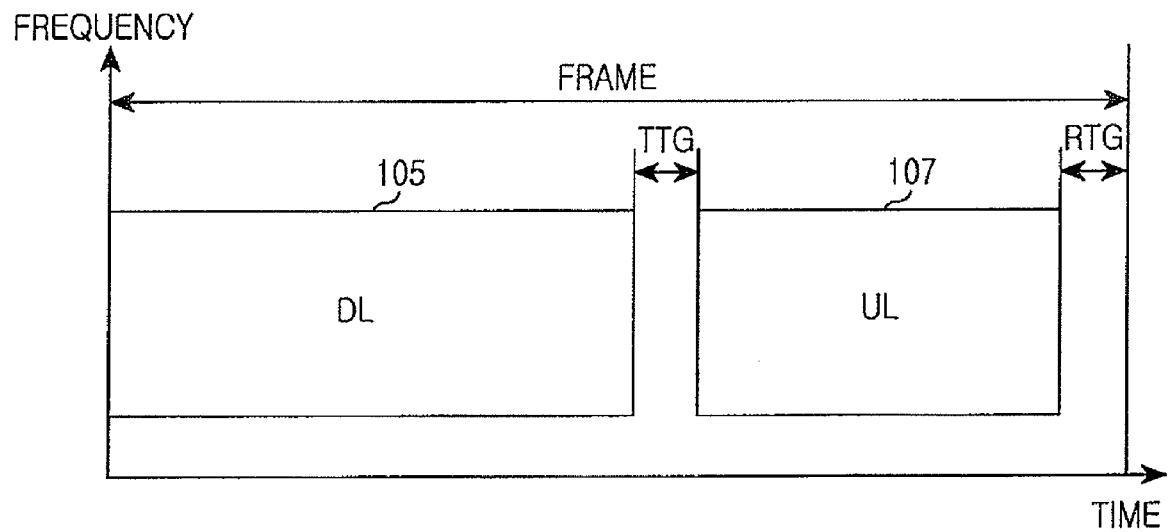
Figure 2:
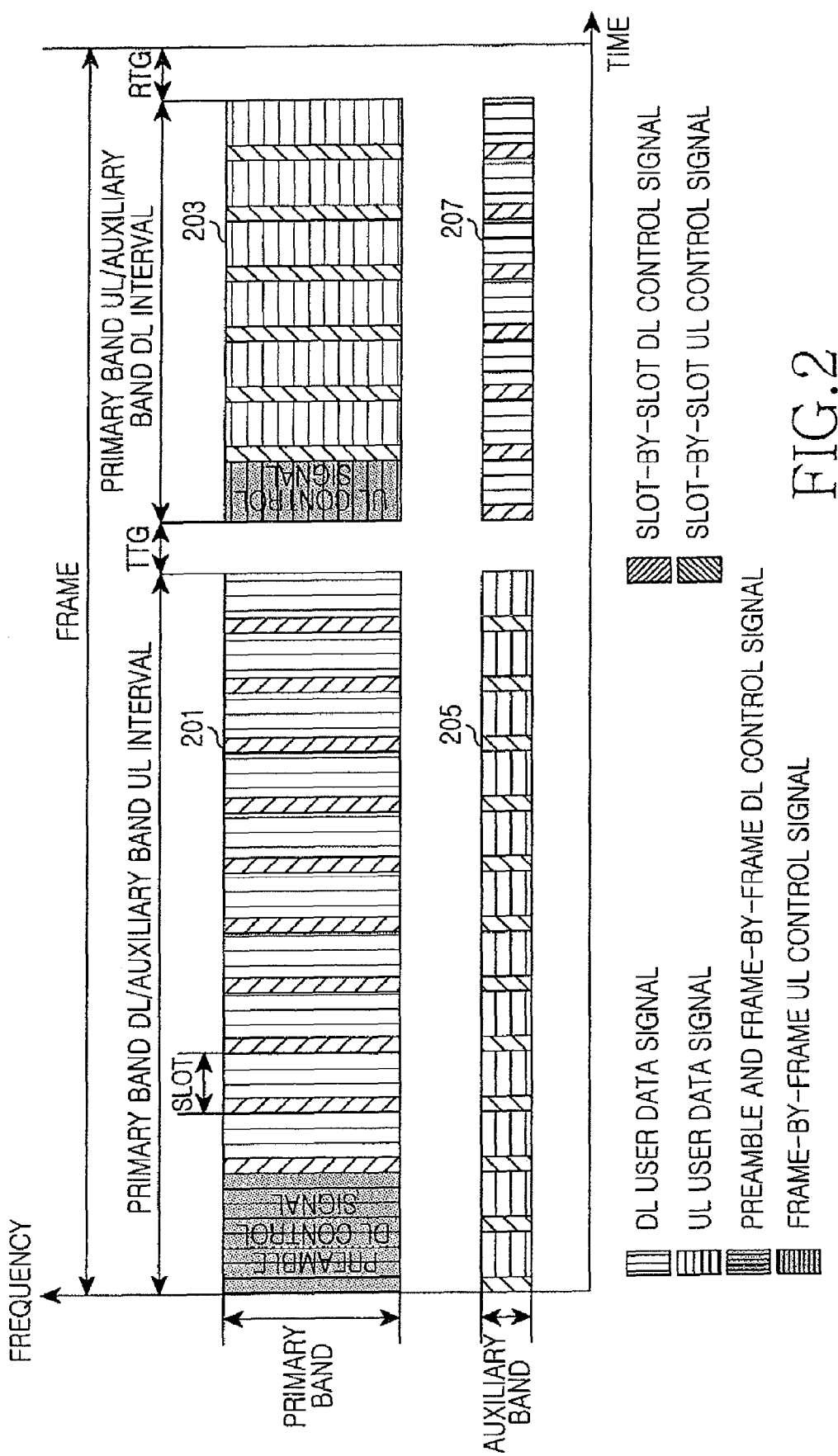
FIG. 2 illustrates a frame structure of a duplex scheme using a primary band and an auxiliary band in a wireless communication system according to an exemplary embodiment of the present invention.

FIG. 2 illustrates a frame structure of a duplex scheme using a primary band and an auxiliary band in a wireless communication system according to an exemplary embodiment of the present invention.

Referring to FIG. 2, a duplex scheme according to this exemplary embodiment transmits and receives DL and UL data signals using two frequency bands, i.e., the primary band and the auxiliary band. In a primary band DL/auxiliary band UL interval, the primary band is used for DL transmission 201 and the auxiliary band is used for UL transmission 205. In a primary band UL/auxiliary band DL interval, the primary band is used for UL transmission 203 and the auxiliary band is used for DL transmission 207. Each of the primary band DL/auxiliary band UL interval (201/205) and the primary band UL/auxiliary band DL interval (203/207) is divided into several slots. A guard interval, i.e., a Transmit-to-receive Transition Gap (TTG) or a Receive-to-transmit Transition Gap (RTG) is inserted between the interval (201/205) and the interval (203/207). The positions and lengths of the TTG and RTG of the primary band are the same as those of the auxiliary band. It will be understood by those skilled in the art that one or more auxiliary band UL intervals and one or more auxiliary band DL intervals may share the same frequency band for one frame. The following description is made on the assumption that one auxiliary band UL interval and one auxiliary band DL interval share the same frequency band for one frame.

An interval at the start of the primary band DL interval 201 is used to transmit a preamble for synchronization and channel estimation, and frame-by-frame DL control signals such as system information, Media Access Protocol (MAP) information about the entire frame, a pilot signal, frame-by-frame feedback information about UL data signals and the like. The rest of the primary band DL interval 201 is divided into several slots. Each of the several slots is further divided into an interval for transmitting slot-by-slot DL control signals such as MAP information about the slot, a pilot signal, and frame-by-frame feedback information about a UL data signal, and an interval for transmitting a DL data signal. The slot-by-slot feedback information may include an Acknowledgement/Negative Acknowledgment (ACK/NACK) response to a UL data signal, channel information, Modulation and Coding Scheme (MCS) information, Channel Quality Indicator (CQI) information, power control information, user information and the like.

An interval at the start of the primary band UL interval 203 is used to transmit frame-by-frame UL control signals such as a ranging signal, a channel sounding signal, CQI information, frame-by-frame feedback information about DL data signals and the like. The rest of the primary band UL interval 203 is divided into several slots. Each of the several slots is further divided into an interval for transmitting slot-by-slot UL control signals such as a pilot signal for UL channel estimation and feedback information about a DL data signal, and an interval for transmitting a UL data signal. The slot-by-slot feedback information may include an ACK/NACK response to a DL data signal, channel information, MCS information, CQI information, power control information, user information and the like.

Each of the auxiliary band UL interval 205 and the auxiliary band DL interval 207 is divided into several slots. The length of the auxiliary band slot may be identical to or different from the length of the primary band slot, and may be changed flexibly so that a portion of time is not used, like the TTG and RTG intervals. Each of the slots of the auxiliary band UL interval 205 is divided into an interval for transmitting slot-by-slot UL control signals such as a pilot signal for UL channel estimation and feedback information about a DL data signal, and an interval for transmitting a UL data signal. The slot-by-slot feedback information may include an ACK/NACK response to a DL data signal, channel information, MCS information, CQI information, power control information, user information and the like.

Each of the slots of the auxiliary band DL interval 207 is divided into an interval for transmitting slot-by-slot DL control signals such as MAP information about the slot, a pilot signal, and feedback information about a UL data signal, and an interval for transmitting a DL data signal. The slot-by-slot feedback information may include an ACK/NACK response to a DL data signal, channel information, MCS information, CQI information, power control information, user information and the like.

Figure 3:
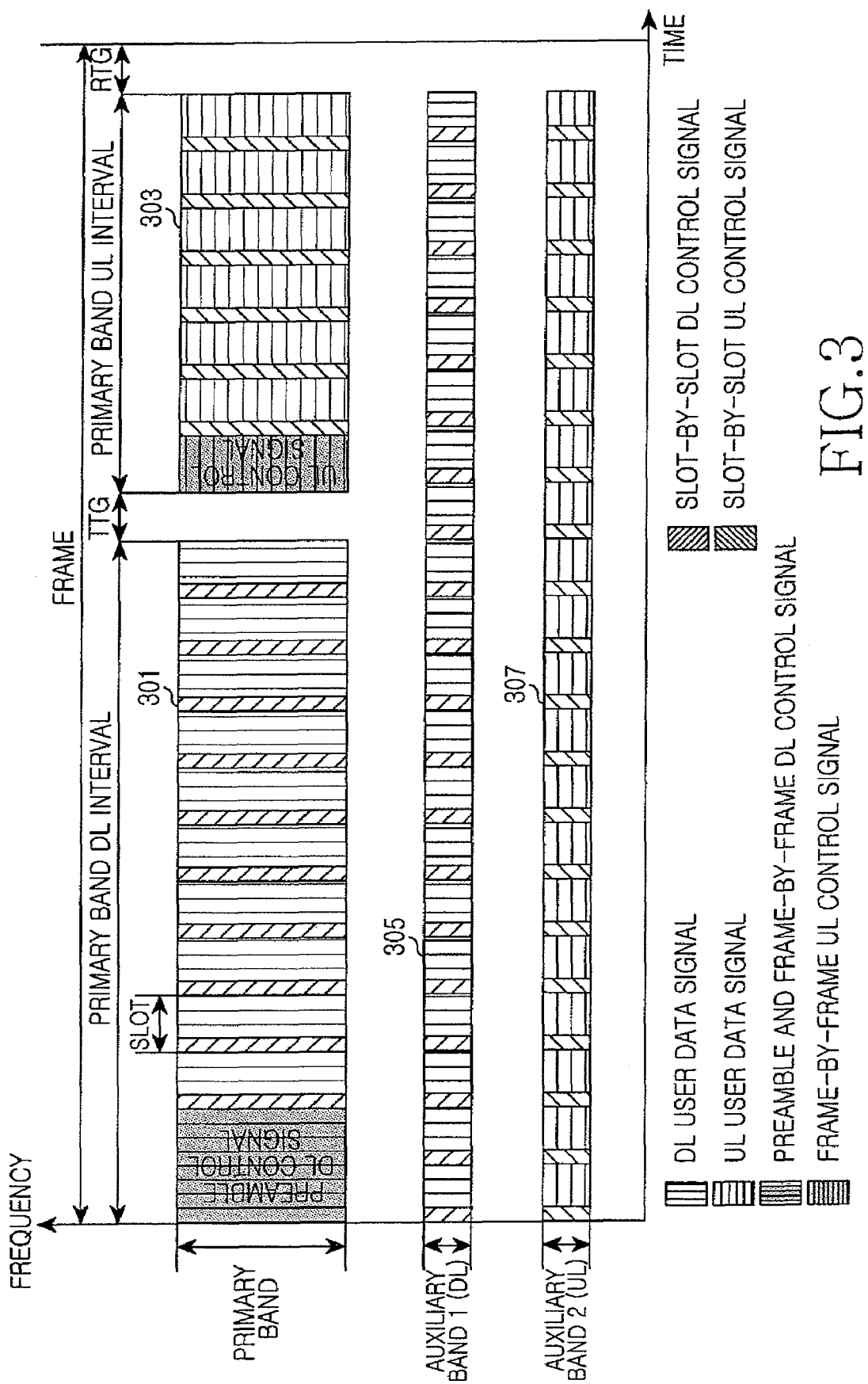
FIG. 3 illustrates a frame structure of a duplex scheme using a primary band and two auxiliary bands in a wireless communication system according to another exemplary embodiment of the present invention.

FIG. 3 illustrates a frame structure of a duplex scheme using a primary band and two auxiliary bands in a wireless communication system according to another exemplary embodiment of the present invention.

Similar to the exemplary duplex scheme illustrated in FIG. 2, a frame structure of a duplex scheme using a primary band and two auxiliary bands as illustrated in FIG. 3 includes a primary band DL interval in which the primary band is used for DL transmission 301 and a primary band UL interval in which the primary band is used for UL transmission 303. Unlike the exemplary duplex scheme using one auxiliary band as illustrated in FIG. 2, the exemplary duplex scheme illustrated in FIG. 3 uses a first auxiliary band 305 dedicated to DL transmission and a second auxiliary band 307 dedicated to UL transmission. The structure of each slot and the signal transmitted in each interval are similar to those in the exemplary duplex scheme illustrated in FIG. 2. A portion of the slot may not be used. For example, if the auxiliary band and the primary band are simultaneously used for DL or UL transmission, the feedback information may not be transmitted by the auxiliary band.

Figure 4:
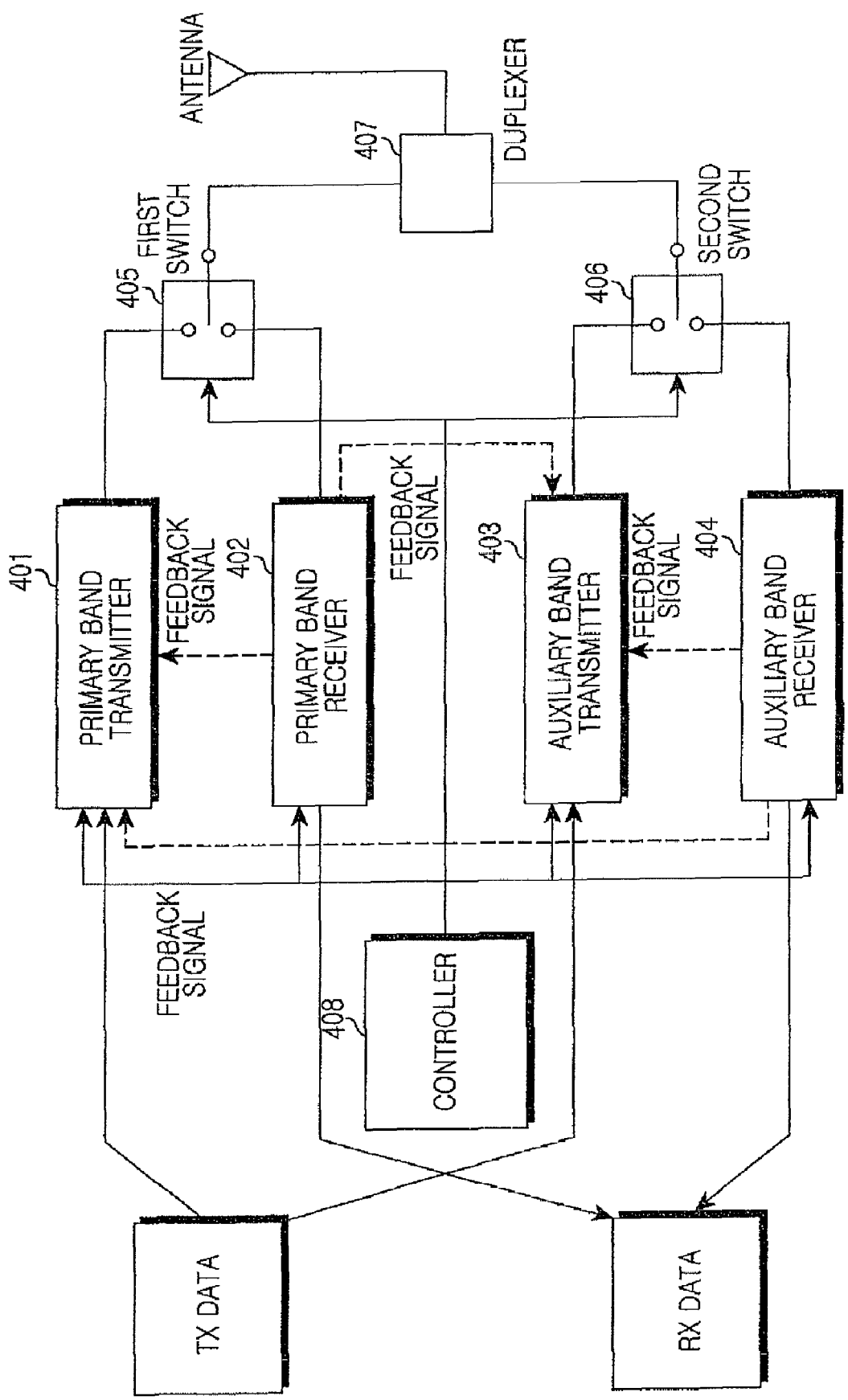
FIG. 4 is a block diagram of a BS transceiver using a primary band and an auxiliary band in a wireless communication system according to an exemplary embodiment of the present invention.

FIG. 4 is a block diagram of a base station (BS) transceiver using a primary band and an auxiliary band in a wireless communication system according to an exemplary embodiment of the present invention. In a first transmission interval of a frame, the BS transmits/receives a DL/UL signal over a primary/auxiliary band. In a second transmission interval of the frame, the BS receives/transmits a UL/DL signal over the primary/auxiliary band.

Referring to FIG. 4, the BS includes a primary band transmitter 401, a primary band receiver 402, an auxiliary band transmitter 403, an auxiliary band receiver 404, a radio-frequency (RF) module capable of supporting both of the primary and auxiliary bands, and a controller 408. The RF module includes a first switch 405, a second switch 406 and a duplexer 407.

The primary band transmitter 401 transmits a DL signal of the primary band under the control of the controller 408. The primary band receiver 402 receives a UL signal of the primary band under the control of the controller 408. The auxiliary band transmitter 403 transmits a DL signal of the auxiliary band under the control of the controller 408. The auxiliary band receiver 404 receives a UL signal of the auxiliary band under the control of the controller 408. The primary/auxiliary band receiver 402/404 extracts feedback information from a signal received over the primary/auxiliary band, and provides the extracted feedback information to the primary/auxiliary band transmitter 401/403. The primary/auxiliary band transmitter 401/403 transmits a signal using the feedback information received from the primary/auxiliary band receiver 402/404. The transmitters and receivers 401, 402, 403 and 404 may be constructed using a modulator/demodulator, a frequency converter, an amplifier, a filter and the like.

The primary band transmitter 401 includes a primary band control signal transmitter (not illustrated) for generating a frame-by-frame DL control signal and transmitting the generated DL control signal in a portion of the first transmission interval. The primary band transmitter 401 also includes a primary band data signal transmitter (not illustrated) for generating a DL data signal in a packet with a slot length and transmitting the generated DL data packet signal in the rest of the first transmission interval for one or more slots. The primary band data signal transmitter includes a control signal transmitter (not illustrated) for generating a DL control signal for a packet with the slot length and transmitting the generated DL control signal in a portion of the slot, and a data signal transmitter (not illustrated) for transmitting a packet with the slot length in the rest of the slot.

The auxiliary band transmitter 403 includes an auxiliary band data signal transmitter (not illustrated) for generating a DL data signal in a packet with a slot length and transmitting the generated DL data packet signal in the second transmission interval for one or more slots. The auxiliary band data signal transmitter includes a control signal transmitter (not illustrated) for generating a DL control signal for a packet with the slot length and transmitting the generated DL control signal in a portion of the slot, and a data signal transmitter (not illustrated) for transmitting a packet with the slot length in the rest of the slot.

Under the control of the controller 408, the first switch 405 switches (i.e., connects) one of the primary band transmitter 401 and the primary band receiver 402 to the duplexer 407 in the primary band DL/UL interval.

Under the control of the controller 408, the second switch 406 switches (i.e., connects) the one of auxiliary band transmitter 403 and the auxiliary band receiver 404 to the duplexer 407 in the auxiliary band DL/UL interval.

The duplexer 407 divides an RX signal, which is received from an antenna, into a primary band RX signal and an auxiliary band RX signal and transmits the primary/auxiliary band RX signal to the primary/auxiliary band receiver 402/404. Also, the duplexer 407 transmits a primary/auxiliary band TX signal, which is received from the primary/auxiliary band transmitter 401/403, to the antenna.

The controller 408 controls transmission/reception of primary/auxiliary band signals in the primary band DL/auxiliary band UL interval and the primary band UL/auxiliary band DL interval by controlling the primary band transmitter 401, the primary band receiver 402, the auxiliary band transmitter 403, the auxiliary band receiver 404, the first switch 405 and the second switch 406.

Figure 5:
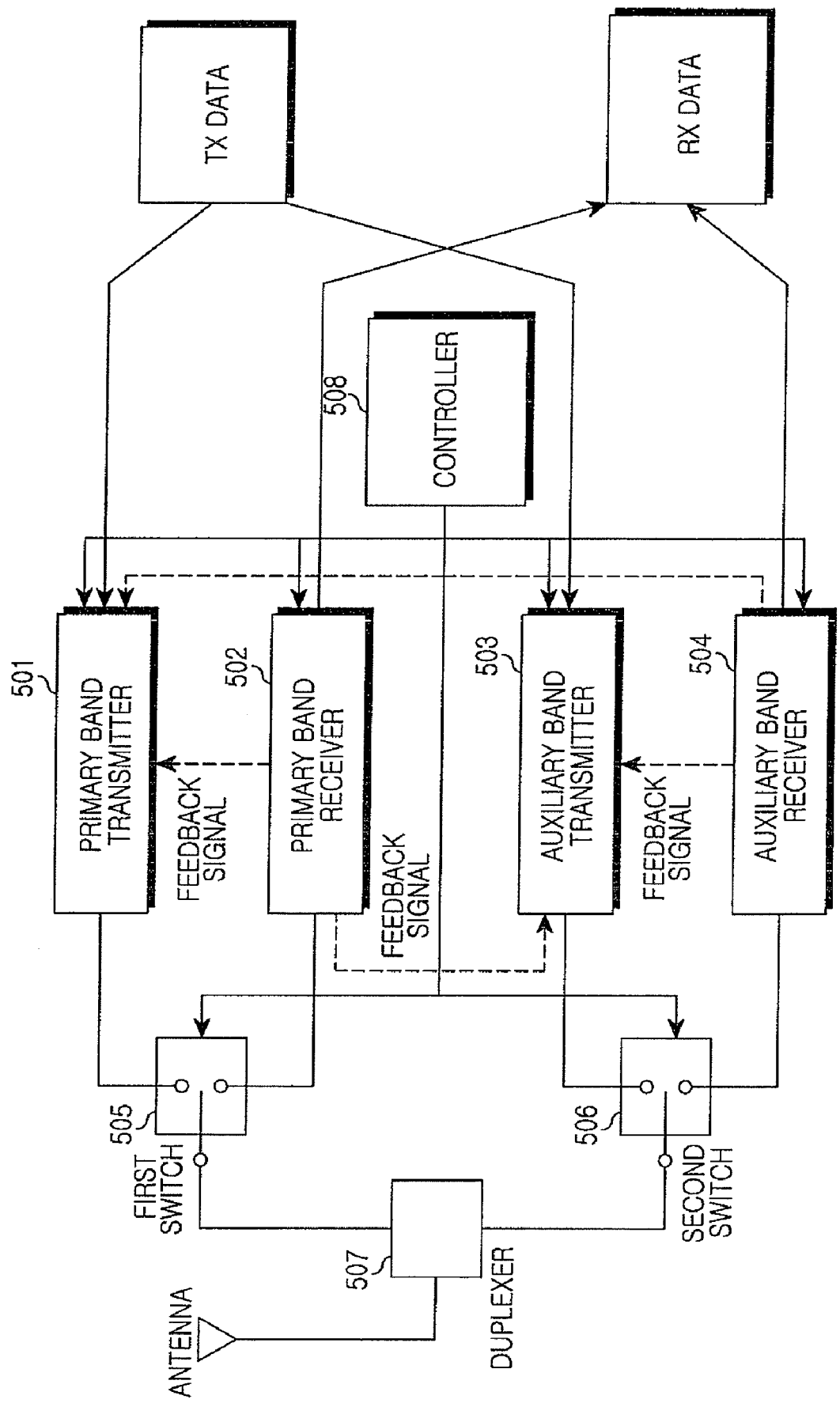
FIG. 5 is a block diagram of an MS transceiver using a primary band and an auxiliary band in a wireless communication system according to an exemplary embodiment of the present invention.

FIG. 5 is a block diagram of a Mobile Station (MS) transceiver using a primary band and an auxiliary band in a wireless communication system according to an exemplary embodiment of the present invention. In a first transmission interval of a frame, the MS receives/transmits a DL/UL signal over a primary/auxiliary band. In a second transmission interval of the frame, the MS transmits/receives a UL/DL signal over the primary/auxiliary band.

Referring to FIG. 5, the MS includes a primary band transmitter 501, a primary band receiver 502, an auxiliary band transmitter 503, an auxiliary band receiver 504, an RF module capable of supporting both of the primary and auxiliary bands, and a controller 508. The RF module includes a first switch 505, a second switch 506 and a duplexer 507.

The primary band transmitter 501 transmits a UL signal of the primary band under the control of the controller 508. The primary band receiver 502 receives a DL signal of the primary band under the control of the controller 508. The auxiliary band transmitter 503 transmits a UL signal of the auxiliary band under the control of the controller 508. The auxiliary band receiver 504 receives a DL signal of the auxiliary band tinder the control of the controller 508. The primary/auxiliary band receiver 502/504 extracts feedback information from a signal received over the primary/auxiliary band, and provides the extracted feedback information to the primary/auxiliary band transmitter 501/503. The primary/auxiliary band transmitter 501/503 transmits a signal using the feedback information received from the primary/auxiliary band receiver 502/504. The transmitters and receivers 501, 502, 503 and 504 may be constructed using a modulator/demodulator, a frequency converter, an amplifier, a filter and the like.

The primary band transmitter 501 includes a primary band control signal transmitter (not illustrated) for generating a frame-by-frame UL control signal and transmitting the generated UL control signal in a portion of the second transmission interval. The primary band transmitter 501 also includes a primary band data signal transmitter (not illustrated) for generating a UL data signal in a packet with a slot length and transmitting the generated UL data packet signal in the rest of the second transmission interval for one or more slots. The primary band data signal transmitter includes a control signal transmitter (not illustrated) for generating a UL control signal for a packet with the slot length and transmitting the generated UL control signal in a portion of the slot, and a data signal transmitter (not illustrated) for transmitting a packet with the slot length in the rest of the slot.

The auxiliary band transmitter 503 includes an auxiliary band data signal transmitter (not illustrated) for generating a UL data signal in a packet with a slot length and transmitting the generated UL data packet signal in the first transmission interval for one or more slots. The auxiliary band data signal transmitter includes a control signal transmitter (not illustrated) for generating a UL control signal for a packet with the slot length and transmitting the generated UL control signal in a portion of the slot, and a data signal transmitter (not illustrated) for transmitting a packet with the slot length in the rest of the slot.

Under the control of the controller 508, the first switch 505 switches (i.e., connects) one of the primary band transmitter 501 and the primary band receiver 502 to the duplexer 507 in the primary band UL/DL interval.

Under the control of the controller 508, the second switch 506 switches (i.e., connects) one of the auxiliary band transmitter 503 and the auxiliary band receiver 504 to the duplexer 507 in the auxiliary band UL/DL interval.

The duplexer 507 divides an RX signal, which is received from an antenna, into a primary band RX signal and an auxiliary band RX signal and transmits the primary/auxiliary band RX signal to the primary/auxiliary band receiver 502/504. Also, the duplexer 507 transmits a primary/auxiliary band TX signal, which is received from the primary/auxiliary band transmitter 501/503, to the antenna.

The controller 508 controls transmission/reception of primary/auxiliary band signals in the primary band DL/auxiliary band UL interval and the primary band UL/auxiliary band DL interval by controlling the primary band transmitter 501, the primary band receiver 502, the auxiliary band transmitter 503, the auxiliary band receiver 504, the first switch 505 and the second switch 506.

Figure 6:
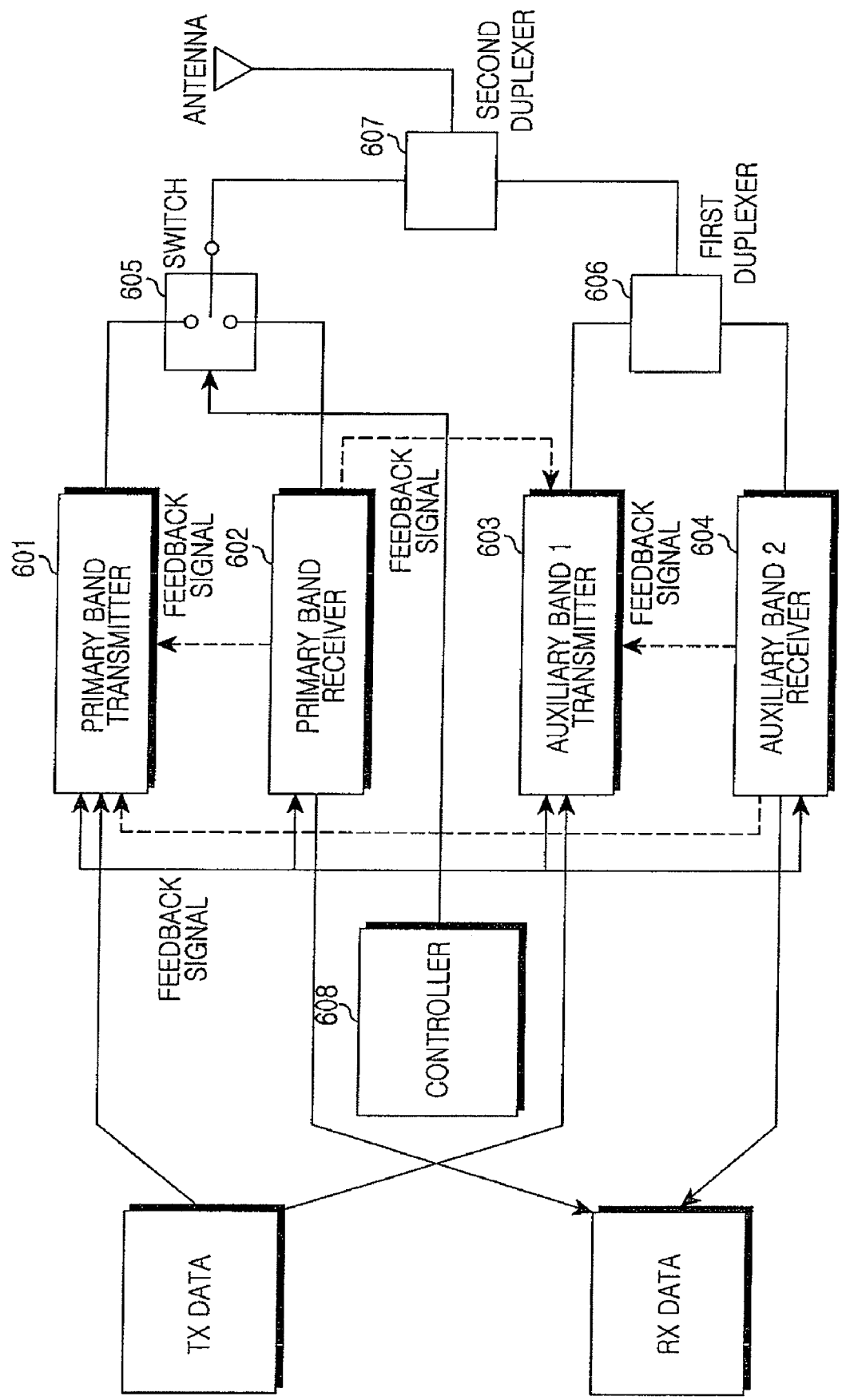
FIG. 6 is a block diagram of a BS transceiver using a primary band and two auxiliary bands in a wireless communication system according to another exemplary embodiment of the present invention.

FIG. 6 is a block diagram of a BS transceiver using a primary band and two auxiliary bands in a wireless communication system according to another exemplary embodiment of the present invention. In a first/second transmission interval of a frame, the BS transmits/receives a DL/UL signal over a primary band. In the entire frame, the BS transmits/receives a DL/UL signal over a first/second auxiliary band 1/2.

Referring to FIG. 6, a BS includes a primary band transmitter 601, a primary band receiver 602, an auxiliary band 1 transmitter 603, an auxiliary band 2 receiver 604, an RF module capable of supporting all of the bands, and a controller 608. The RF module includes a switch 605, a first duplexer 606 and a second duplexer 607.

The primary band transmitter 601 transmits a DL signal of the primary band under the control of the controller 608. The primary band receiver 602 receives a UL signal of the primary band under the control of the controller 608. The auxiliary band 1 transmitter 603 transmits a DL signal of the first auxiliary band 1 under the control of the controller 608. The auxiliary band 2 receiver 604 receives a UL signal of the second auxiliary band 2 under the control of the controller 608. The primary band/auxiliary band 2 receiver 602/604 extracts feedback information from a signal received over the primary band/auxiliary band 2, and provides the extracted feedback information to the primary band/auxiliary band 1 transmitter 601/603. The primary band/auxiliary band 1 transmitter 601/603 transmits a signal using the feedback information received from the primary band/auxiliary band 2 receiver 602/604. The transmitters and receivers 601, 602, 603 and 604 may be constructed using a modulator/demodulator, a frequency converter, an amplifier, a filter and the like.

The primary band transmitter 601 includes a primary band control signal transmitter (not illustrated) for generating a frame-by-frame DL control signal and transmitting the generated DL control signal in a portion of the first transmission interval The primary band transmitter 601 also includes a primary band data signal transmitter (not illustrated) for generating a DL data signal in a packet with a slot length and transmitting the generated DL data packet signal in the rest of the first transmission interval for one or more slots. The primary band data signal transmitter includes a control signal transmitter (not illustrated) for generating a DL control signal for a packet with the slot length and transmitting the generated DL control signal in a portion of the slot, and a data signal transmitter (not illustrated) for transmitting a packet with the slot length in the rest of the slot.

The auxiliary band 1 transmitter 603 includes an auxiliary band data signal transmitter (not illustrated) for generating a DL data signal in a packet with a slot length and transmitting the generated DL data packet signal for one or more slots. The auxiliary band data signal transmitter includes a control signal transmitter (not illustrated) for generating a DL control signal for a packet with the slot length and transmitting the generated DL control signal in a portion of the slot, and a data signal transmitter (not illustrated) for transmitting a packet with the slot length in the rest of the slot.

Under the control of the controller 608, the switch 605 switches (i.e., connects) one of the primary band transmitter 601 and the primary band receiver 602 to the second duplexer 607 in the primary band DL/UL interval.

The first duplexer 606 outputs a signal received from the auxiliary band 1 transmitter 603, to the second duplexer 607, and outputs a signal received from the second duplexer 607 to the auxiliary band 2 receiver 604.

The second duplexer 607 outputs a signal, which is received from the primary band/auxiliary band 1 transmitter 601/603 through the switch 605/the first duplexer 606, to an antenna. Also, the second duplexer 607 divides an RX signal, which is received from the antenna, into a primary band RX signal and an auxiliary band 2 RX signal and transmits the primary band/auxiliary band 2 RX signal to the switch 605/ the first duplexer 606.

The controller 608 controls transmission/reception of primary/auxiliary band signals in the primary band DL/UL interval by controlling the primary band transmitter 601, the primary band receiver 602, the auxiliary band 1 transmitter 603, the auxiliary band 2 receiver 604, the switch 605 and the first duplexer 606.

Figure 7:
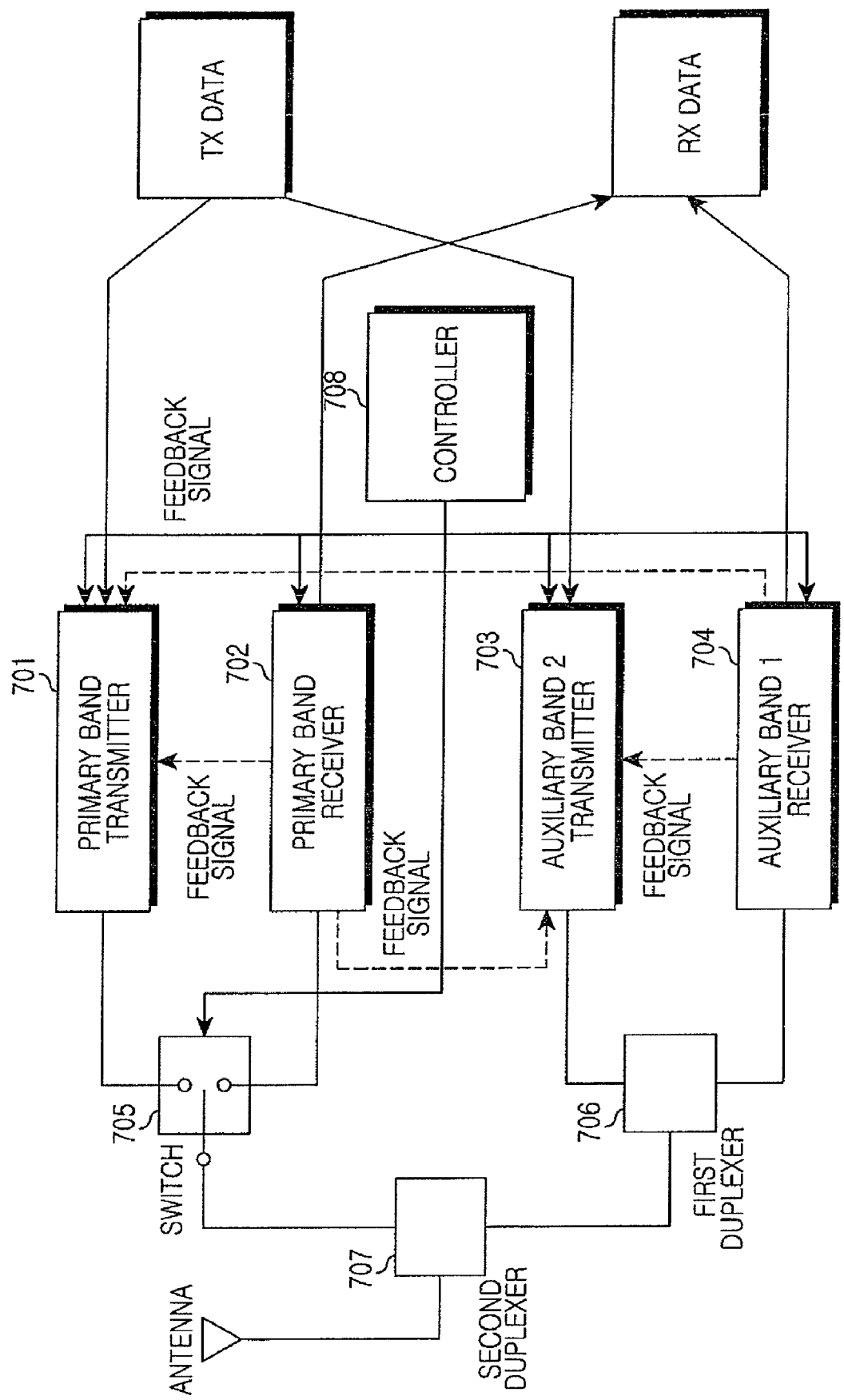
FIG. 7 is a block diagram of an MS transceiver using a primary band and two auxiliary bands in a wireless communication system according to another exemplary embodiment of the present invention.

FIG. 7 is a block diagram of an MS transceiver using a primary band and two auxiliary bands in a wireless communication system according to another exemplary embodiment of the present invention. In a first/second transmission interval of a frame, the MS receives/transmits a DL/UL signal over a primary band. In the entire frame, the MS receives/transmits a DL/UL signal over a first/second auxiliary band 1/2.

Referring to FIG. 7, the MS includes a primary band transmitter 701, a primary band receiver 702, an auxiliary band 2 transmitter 703, an auxiliary band 1 receiver 704, an RF module capable of supporting all of the bands, and a controller 708. The RF module includes a switch 705, a first duplexer 706, and a second duplexer 707.

The primary band transmitter 701 transmits a UL signal of the primary band under the control of the controller 708. The primary band receiver 702 receives a DL signal of the primary band under the control of the controller 708. The auxiliary band 2 transmitter 703 transmits a UL signal of the second auxiliary band 2 under the control of the controller 708. The auxiliary band 1 receiver 704 receives a DL signal of the first auxiliary band 1 under the control of the controller 708. The primary band/auxiliary band 1 receiver 702/704 extracts feedback information from a signal received over the primary band/auxiliary band 1, and provides the extracted feedback information to the primary band/auxiliary band 2 transmitter 701/703. The primary band/auxiliary band 2 transmitter 701/703 transmits a signal using the feedback information received from the primary band/auxiliary band 1 receiver 702/704. The transmitters and receivers 701, 702, 703 and 704 may be constructed using a modulator/demodulator, a frequency converter, an amplifier, a filter and the like.

The primary band transmitter 701 includes a primary band control signal transmitter (not illustrated) for generating a frame-by-frame UL control signal and transmitting the generated UL control signal in a portion of the second transmission interval The primary band transmitter 701 also includes a primary band data signal transmitter (not illustrated) for generating a UL data signal in a packet with a slot length and transmitting the generated UL data packet signal in the rest of the second transmission interval for one or more slots. The primary band data signal transmitter includes a control signal transmitter (not illustrated) for generating a UL control signal for a packet with the slot length and transmitting the generated UL control signal in a portion of the slot, and a data signal transmitter (not illustrated) for transmitting a packet with the slot length in the rest of the slot.

The auxiliary band 2 transmitter 703 includes an auxiliary band data signal transmitter (not illustrated) for generating a UL data signal in a packet with a slot length and transmitting the generated UL data packet signal for one or more slots. The auxiliary band data signal transmitter includes a control signal transmitter (not illustrated) for generating a UL control signal for a packet with the slot length and transmitting the generated UL control signal in a portion of the slot, and a data signal transmitter (not illustrated) for transmitting a packet with the slot length in the rest of the slot.

Under the control of the controller 708, the switch 705 switches (i.e., connects) one of the primary band transmitter 701 and the primary band receiver 702 to the second duplexer 707 in the primary band UL/DL interval.

The first duplexer 706 outputs a signal received from the auxiliary band 2 transmitter 703, to the second duplexer 707, and outputs a signal received from the second duplexer 707 to the auxiliary band 1 receiver 704.

The second duplexer 707 outputs a signal, which is received from the primary band/auxiliary band 2 transmitter 701/703 through the switch 705/the first duplexer 706, to an antenna. Also, the second duplexer 707 divides an RX signal, which is received from the antenna, into a primary band RX signal and an auxiliary band 1 RX signal and transmits the primary band/auxiliary band 1 RX signal to the switch 705/the first duplexer 706.

The controller 708 controls transmission/reception of primary/auxiliary band signals in the primary band DL/UL interval by controlling the primary band transmitter 701, the primary band receiver 702, the auxiliary band 2 transmitter 703, the auxiliary band 1 receiver 704, the switch 705 and the first duplexer 706.

In the above-described exemplary embodiment, one DL/UL data packet is generated/transmitted for one slot. Alternatively, one DL/UL data packet may be generated/transmitted for a plurality of slots. In this case, the control signal may be transmitted only in the start slot of the packet. In the above-described exemplary embodiment, the system has one primary band and one or two auxiliary bands. Alternatively, the system may have a plurality of primary bands and a plurality of auxiliary bands.

In accordance with exemplary embodiments of the present invention as described above, one or more auxiliary bands are added to a primary band in a TDD wireless communication system, and a signal is transmitted/received through a frame constituted by a plurality of short slots. Therefore, the delay requirements can be satisfied by transmitting/receiving feedback information and a data signal requiring a small delay in units of slots. The feedback accuracy can be increased by successively transmitting/receiving slot-by-slot feedback information such as an ACK/NACK response, channel information, and power control information using the auxiliary bands. Also, adaptive modulation and multiple antenna technologies can be used effectively even in the case of a rapid channel change. The transmission efficiency can be increased by transmitting/receiving signals allowing a large delay in units of frames. Exemplary embodiments of the present invention can reduce a transmission efficiency loss due to transmission of the control signal the guard interval by increasing the size of a frame. That is, compared to the conventional TDD system, the cell size can be increased without an efficiency loss due to overhead, by increasing the guard interval and the frame length. The TDD scheme using the auxiliary bands according to exemplary embodiments of the present invention also has the advantages of the conventional TDD scheme. That is, the present invention can effectively cope with a DL-UL asymmetric traffic by flexibly adjusting a DL-UL ratio, and the transmission efficiency of a low-speed user terminal can be increased using the channel reciprocity.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for bidirectional communication using one or more auxiliary bands in a wireless communication system, comprising:
   a primary band transmitter for transmitting data over one or more primary bands in a frame;
   a primary band receiver for receiving data over the one or more primary bands in the frame;
   an auxiliary band transmitter for transmitting data over one or more first auxiliary bands in the frame;
   an auxiliary band receiver for receiving data over at least one of the one or more first auxiliary bands and one or more second auxiliary bands in the frame;
   a first switch for switching one of the primary band transmitter and the primary band receiver to a duplexer in a primary band TX interval and a primary band RX interval, respectively; and
   a second switch for switching one of the auxiliary band transmitter and the auxiliary band receiver to the duplexer in an auxiliary band TX interval and an auxiliary band RX interval, respectively,
   wherein the duplexer divides RX data to transmit one of primary band RX data and auxiliary band RX data to one of the first switch and the second switch, respectively, and transmits TX data received from one of the first switch and the second switch, respectively, to an antenna.

2. The apparatus of claim 1, wherein the bidirectional communication comprises bidirectional communication using a time division duplex (TDD) scheme.

3. The apparatus of claim 1, wherein the primary band transmitter comprises:
   a primary band control signal transmitter for generating a frame-by-frame control signal and for transmitting the generated control signal in a portion of a primary band TX interval; and
   a primary band data signal transmitter for generating data in a packet with the length of one or more slots and for transmitting the generated data packet in the rest of the primary band TX interval for one or more slots.

4. The apparatus of claim 3, wherein the primary band data signal transmitter comprises:
   a data signal transmitter for generating data in a packet with the length of one or more slots and for transmitting the generated data packet in the rest of the primary band TX interval for one or more slots; and a control signal transmitter for generating a control signal for the generated data packet and for transmitting the generated control signal in a portion of the slot.

5. The apparatus of claim 3, wherein if the data transmitted over the primary band comprises downlink (DL) data, the frame-by-frame control signal comprises at least one of a preamble, system information, MAP information about the entire frame, a pilot signal, and frame-by-frame feedback information about uplink (UL) data.

6. The apparatus of claim 3, wherein if the data transmitted over the primary band comprises UL data, the frame-by-frame control signal comprises at least one of a ranging signal, a channel sounding signal, channel quality indicator (CQI) information, and frame-by-frame feedback information about DL data.

7. The apparatus of claim 4, wherein if the data transmitted over the primary band comprises DL data, the control signal for the generated data packet comprises at least one of MAP information about the slot, a pilot signal, and frame-by-frame feedback information about UL data.

8. The apparatus of claim 7, wherein the frame-by-frame feedback information about UL data comprises at least one of an ACK/NACK response to UL data, channel information, modulation and coding scheme (MCS) information, CQI information, power control information, and user information.

9. The apparatus of claim 4, wherein if the data transmitted over the primary band comprises UL data, the control signal for the generated data packet comprises at least one of a pilot signal and frame-by-frame feedback information about DL data.

10. The apparatus of claim 9, wherein the frame-by-frame feedback information about DL data comprises at least one of an ACK/NACK response to DL data, channel information, MCS information, CQI information, power control information, and user information.

11. The apparatus of claim 1, wherein the auxiliary band transmitter comprises:

a data signal transmitter for generating data in a packet with the length of one or more slots and for transmitting the generated data packet in an auxiliary band TX interval for one or more slots; and a control signal transmitter for generating a control signal for the generated data packet and for transmitting the generated control signal in a portion of the slot.

12. The apparatus of claim 11, wherein if the data transmitted over the auxiliary band comprises DL data, the control signal for the generated data packet comprises at least one of MAP information about the slot, a pilot signal, and frame-by-frame feedback information about UL data.

13. The apparatus of claim 12, wherein the frame-by-frame feedback information about UL data comprises at least one of an ACK/NACK response to UL data, channel information, MCS information, CQI information, power control information, and user information.

14. The apparatus of claim 11, wherein if the data transmitted over the auxiliary band comprises UL data, the control signal for the generated data packet comprises at least one of a pilot signal and frame-by-frame feedback information about DL data.

15. The apparatus of claim 14, wherein the frame-by-frame feedback information about DL data comprises at least one of an ACK/NACK response to DL data, channel information, MCS information, CQI information, power control information, and user information.

16. A base station (BS) for bidirectional communication using one or more auxiliary bands in a wireless communication system, comprising:

a primary band transmitter for transmitting data over one or more primary bands in a frame;

a primary band receiver for receiving data over the one or more primary bands in the frame;

an auxiliary band transmitter for transmitting data over one or more first auxiliary bands in the frame;

an auxiliary band receiver for receiving data over at least one of the one or more first auxiliary bands and one or more second auxiliary bands in the frame;

a first switch for switching one of the primary band transmitter and the primary band receiver to a duplexer in a primary band TX interval and a primary band RX interval, respectively; and a second switch for switching one of the auxiliary band transmitter and the auxiliary band receiver to the duplexer in an auxiliary band TX interval and an auxiliary band RX interval, respectively, wherein the duplexer divides RX data to transmit one of primary band RX data and auxiliary band RX data to one of the first switch and the second switch, respectively, and transmits TX data received from one of the first switch and the second switch, respectively, to an antenna.

17. A mobile station (MS) for bidirectional communication using one or more auxiliary bands in a wireless communication system, comprising:

a primary band transmitter for transmitting data over one or more primary bands in a frame;

a primary band receiver for receiving data over the one or more primary bands in the frame;

an auxiliary band transmitter for transmitting data over one or more first auxiliary bands in the frame;

an auxiliary band receiver for receiving data over at least one of the one or more first auxiliary bands and one or more second auxiliary bands in the frame;

a first switch for switching one of the primary band transmitter and the primary band receiver to a duplexer in a primary band TX interval and a primary band RX interval, respectively; and a second switch for switching one of the auxiliary band transmitter and the auxiliary band receiver to the duplexer in an auxiliary band TX interval and an auxiliary band RX interval, respectively, wherein the duplexer divides RX data to transmit one of primary band RX data and auxiliary band RX data to one of the first switch and the second switch, respectively, and transmits TX data received from one of the first switch and the second switch, respectively, to an antenna.

* * * * *